Patented Nov. 7, 1933

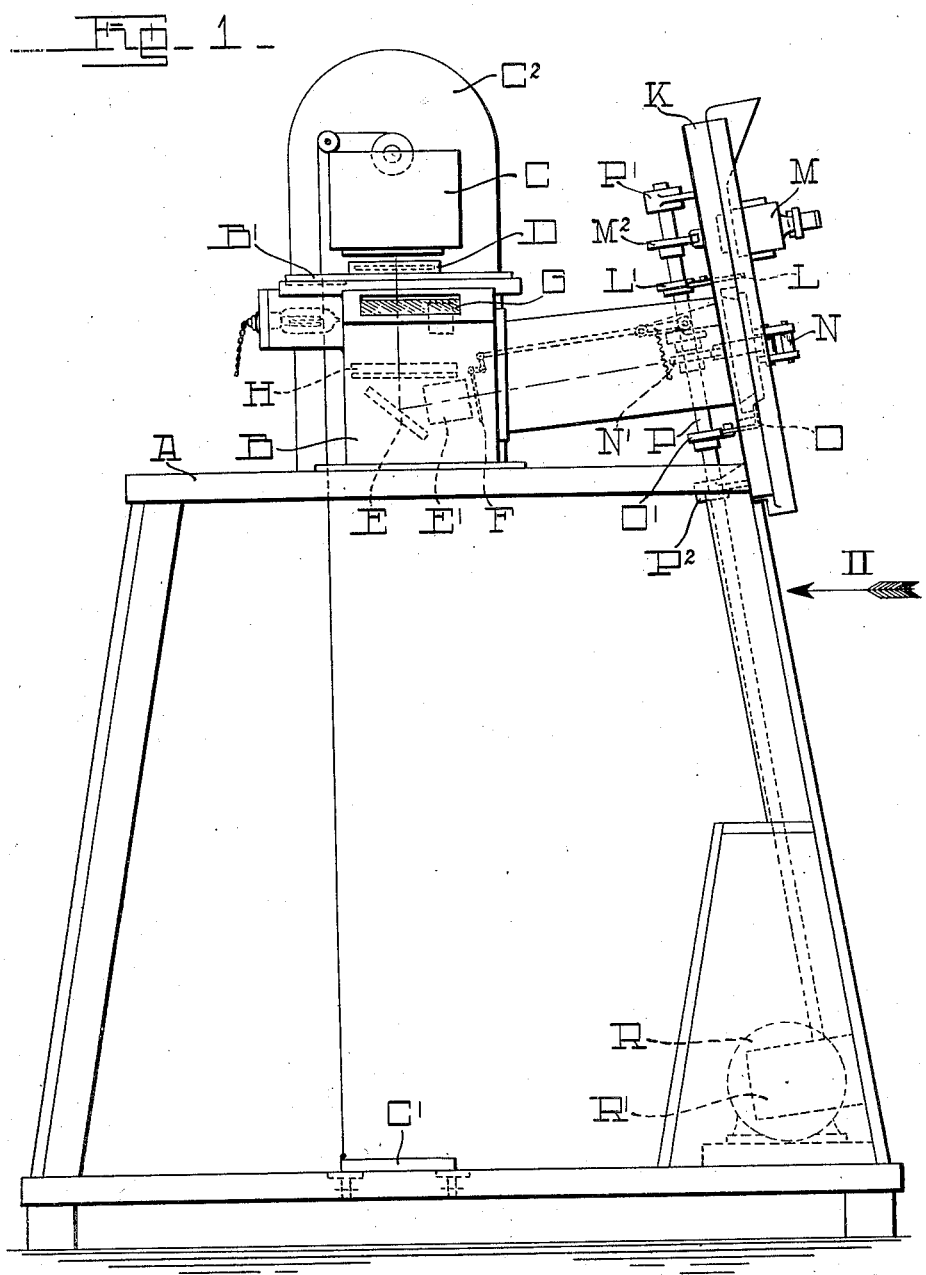

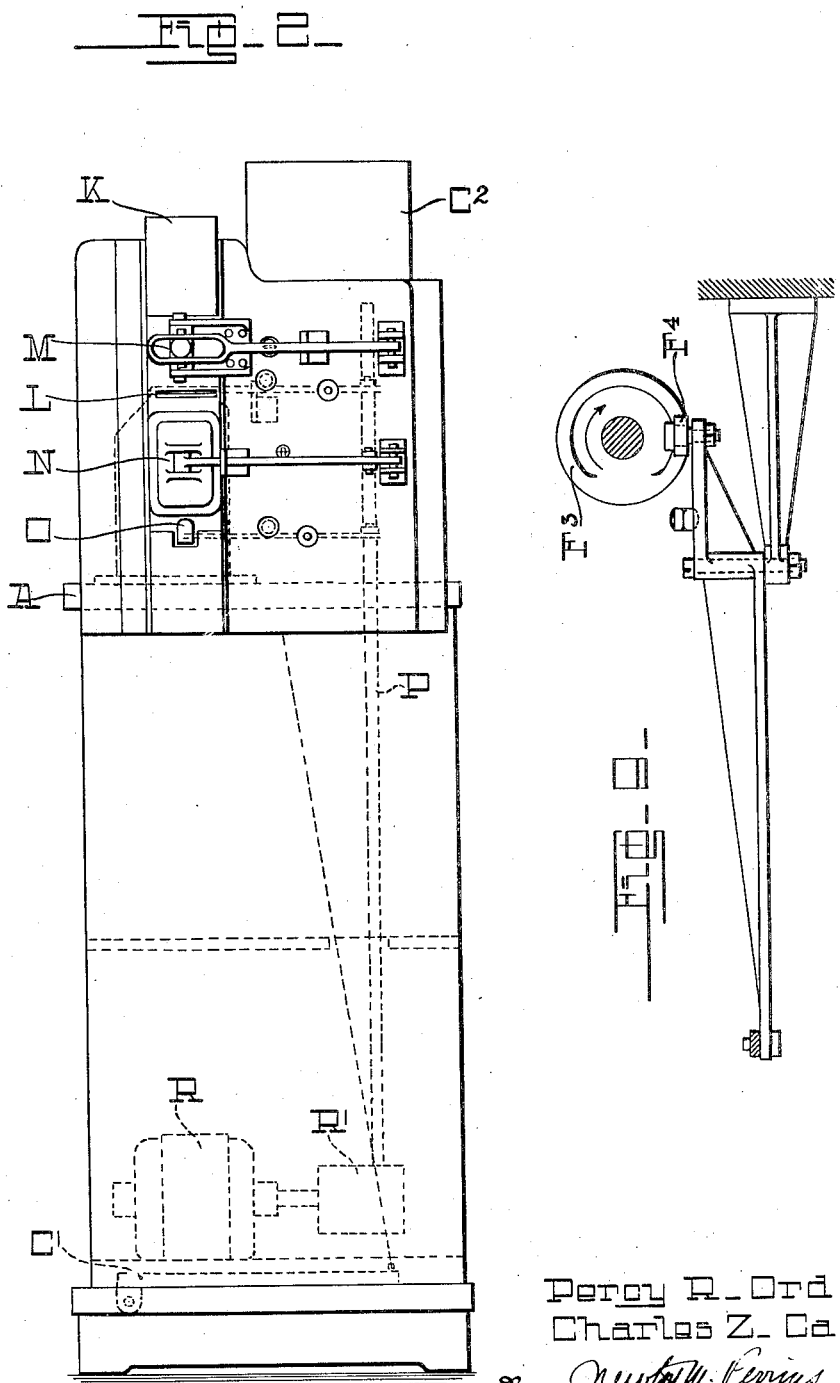

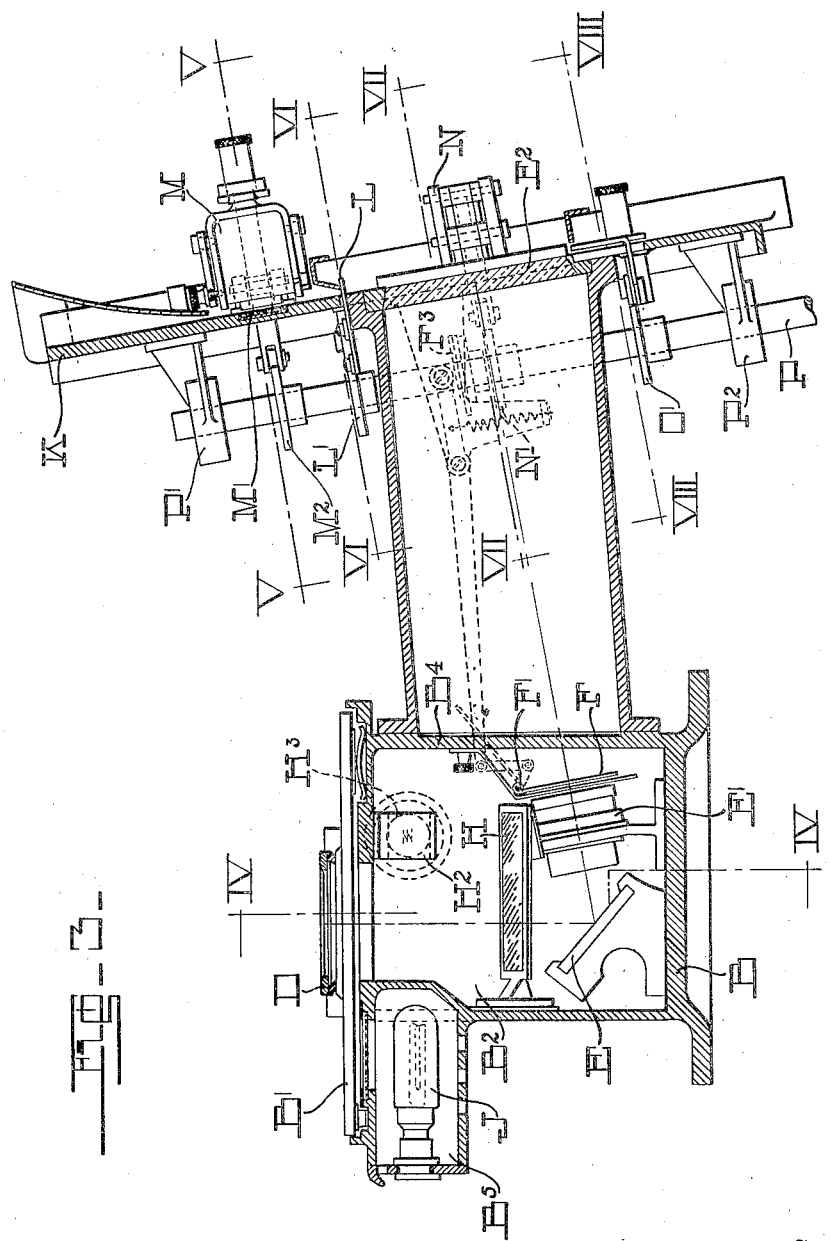

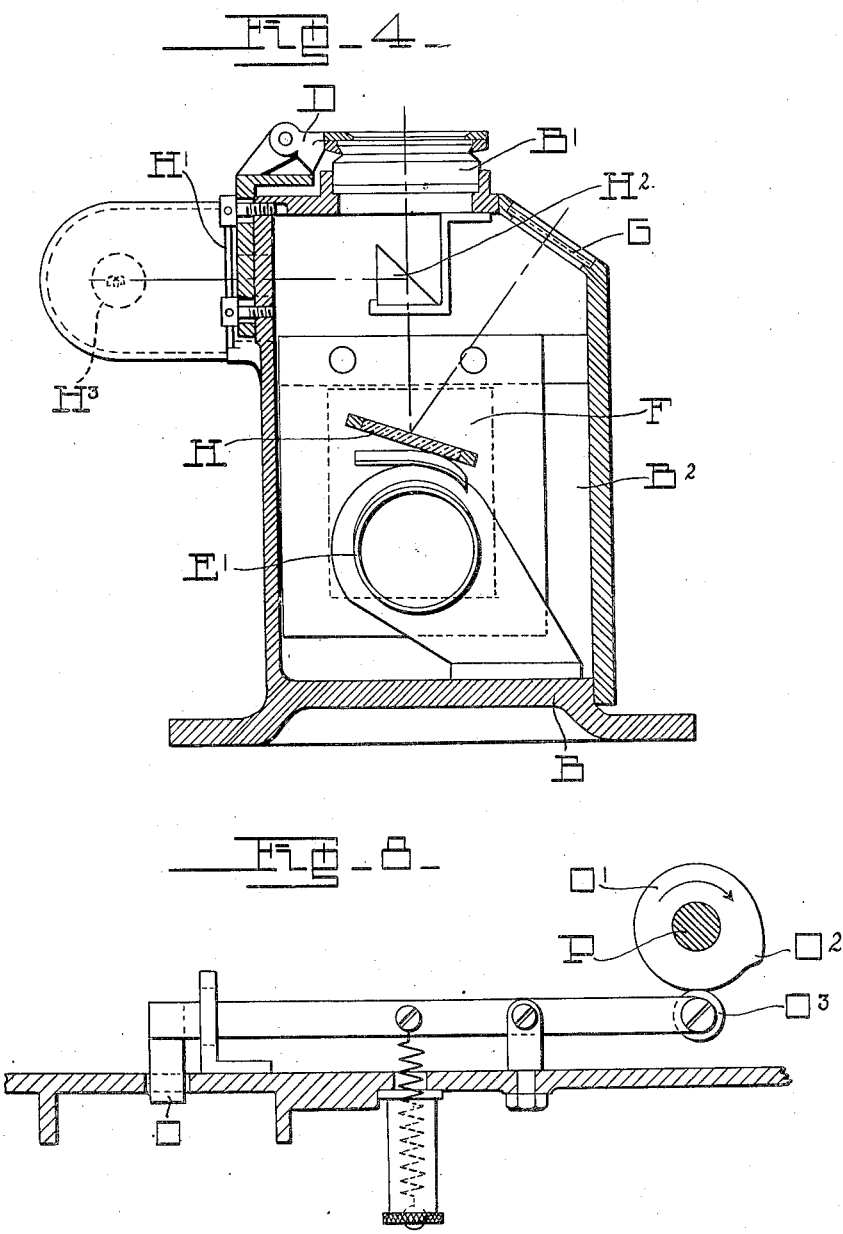

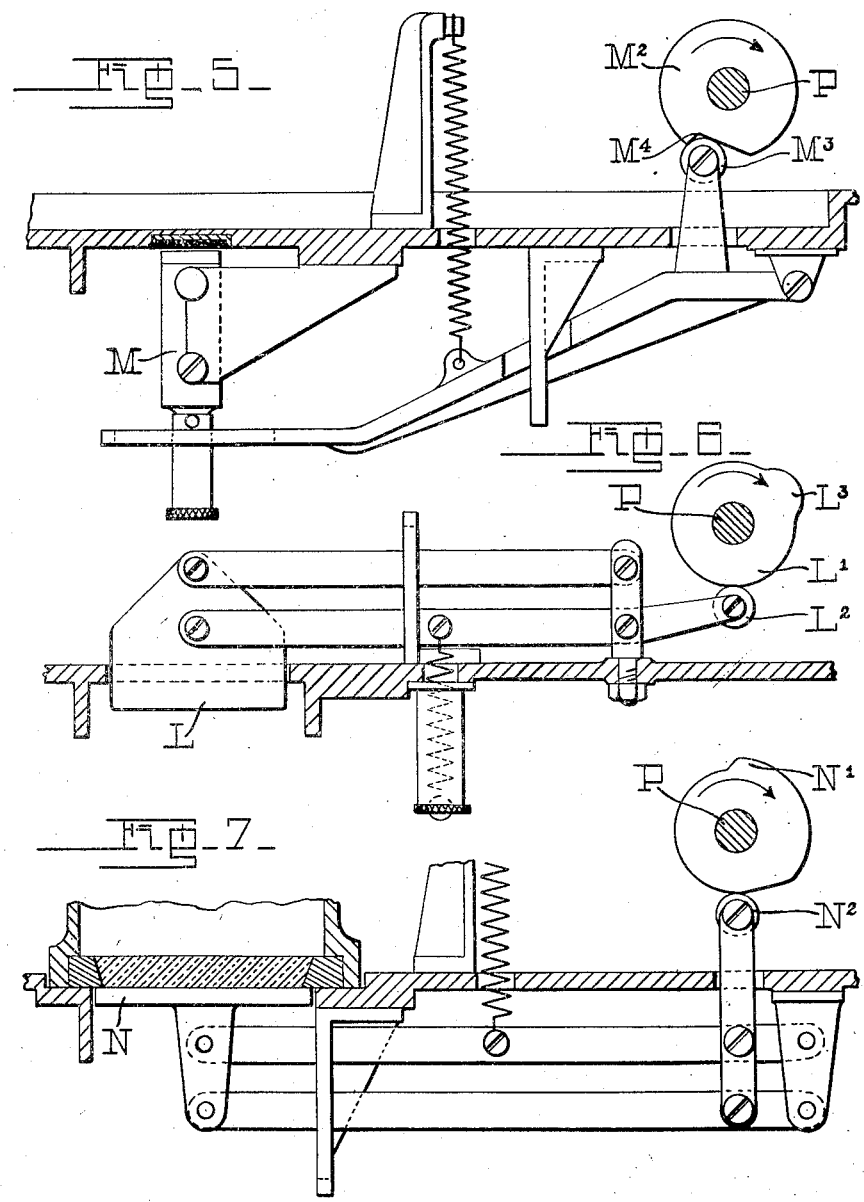

1,933,788

UNITED STATES PATENT OFFICE 1,933,788

PHOTOGRAPHIC PRINTING APPARATUS

Charles Zopher Case, London, England, and Percy R. Ord, Rochester, N. Y., assignors to Eastman Kodak Company, Rochester, N. Y., a corporation of New York Application June 11, 1929, Serial No. 369,943, and in Great Britain June 14, 1928

5 Claims. (Cl. 88—24)

This invention relates to photographic printing apparatus and has for its object to provide a compact and simple apparatus to which the printing paper or other sensitized surface is automatically supplied leaving the hands of the operator free to manipulate the negative and to control the printing light.

According to this invention an image of the negative is projected by a lens upon a printing surface and independent means are provided for automatically feeding a sensitized printing sheet into the printing position and for intermittently actuating a shutter which effects the exposure.

Preferably the source of light is arranged above a substantially horizontal frame or table upon which the negative is supported and a mirror is provided below the table so that the image of the negative is projected through the lens on to the printing surface which is approximately at right angles to the plane of the negative. In addition mirrors are arranged which enable the operator to observe preferably through suitably tinted and adjacent inspection windows the density of the negative and whether it is properly centered with relation to the printing opening.

The paper feed, shutter and pressure plate for the printing paper are all actuated by a common rotary shaft furnished with cams which may be adjusted to vary the duration of the exposure, the moment at which exposure starts and also to control the paper feed mechanism. In addition the operator, without changing the setting of the cams or varying the speed of rotation of the shaft can adjust the effective exposure by controlling the amount of printing light, e. g. by adjusting the distance between the source of light and the negative in accordance with the density of the printing characteristics of the latter.

It may be desirable to provide means for printing numbers or other identifying marks on the backs of the sensitized printing paper. As a rule, when the numbering device forms a part of the printing apparatus, it is automatically actuated when the pressure board or backing is applied to press the paper against the negative and there is a tendency for this number to be visible on the face of the finished print. Investigation has proved that this is not due to any chemical action of the printing ink but to the local pressure of the numbering device upon the paper fibres which are thereby compressed so as to vary the reflection characteristics of the paper.

A feature of the present invention consists in so arranging the numbering device that it is brought into operation when the paper is not being exposed, and means are provided to prevent the numbering device from compressing the paper to an injurious extent prior to or after the exposure.

Preferably the individual pieces of printing paper are passed under the numbering device before they come into the exposure position so that on their release after exposure they can be placed directly into a developing or other bath in which they are immersed. Further, some means in the form of a stop or like pressure limiting device may be provided to prevent the excessive compression or consolidation of the paper fibres during the numbering operation. Conveniently the numbering device is mounted above the pressure plate and a stop is provided so that the paper is passed under the device and over a resilient pad or support before it reaches the printing opening; the numbering device and the stop which holds the paper in position during numbering can then be actuated by the common rotary shaft.

The prints may be made either upon a continuous strip of paper or other sensitized material or upon separate sheets the object of the machine being to enable one or more prints to be made from either separate negatives or negatives of different subjects in a continuous length of film as opposed to printing a sequence of pictures upon an endless band from a strip of cinematograph or like film.

If separate sheets are used for each print the feed mechanism conveniently comprises a reciprocating frame or carriage furnished with a series of pivotally mounted resilient fingers adapted at each forward movement of the frame to transfer the uppermost sheet in a pile or stack or paper to a delivery chute leading to the printing opening. Alternatively, if a continuous strip of paper is used rollers or other intermittently actuated feed members may be used to advance the strip a predetermined extent after each exposure.

The following is a description by way of example of one form of apparatus constructed in accordance with the invention and illustrated in the accompanying drawings, in which Figure 1 is a front elevation of the assembled apparatus, Figure 2 is an end elevation in the direction of the arrow II of Figure 1, Figure 3 shows a front sectional elevation of the projecting system, Figure 4 shows an end sectional elevation of the projecting system on the line IV—IV of Figure 3, Figures 5-8 are sectional views in plan of the individual cam control mechanisms on the lines V—V, VI—VI, VII—VII, and VIII—VIII respectively of Figure 3, and Figure 9 is a plan of the shutter controlling mechanism.

The apparatus comprises a substantially horizontal table A (Figure 1) of such a height that the operator when seated can easily manipulate a strip of photographic negatives or individual negatives over a window $B^1$ in a box B supported on the table and containing the projecting system. Above the window $B^1$ is arranged a suitable printing lamp contained in a casing C and arranged so that the effective intensity of the lamp can readily be adjusted, as for example by varying the distance between the lamp and the negative by some such means as a cord or lever mechanism connected to a pedal $C^1$ which can be actuated by the operator's foot.

Referring now to Figures 3 and 4, the box B is divided into two main chambers $B^2$ and $B^3$ by means of a vertical partition $B^4$ having an opening therein through which the image of the negative is projected on to the printing surface on the end wall of the chamber $B^3$ in a manner to be more fully described hereinafter.

Immediately below the negative, which is supported below a frame D on the window $B^1$, is a mirror E supported in the box $B^2$ at such an angle to the negative that it projects the image of the negative through a lens $E^1$ and the opening in the partition $B^4$ on to the end wall of the chamber $B^3$, which is provided with a glass screen $E^2$ behind which the printing paper is disposed. To enable the operator to make a preliminary estimate of the density of the printing negative and to adjust the printing light accordingly, a pilot lamp J is mounted below the window $B^1$ in a small chamber $B^5$ attached to or forming part of the box B over which the negative can then be moved before it reaches the frame D under which it is held during the actual printing operation.

The exposure of the printing paper is effected by a hinged shutter F disposed between the lens $E^1$ and the plate $E^2$. The shutter is arranged so that it hinges about a pivot $F^1$ into the position shown in dotted lines in Figure 3 when it is actuated by the control mechanism.

In order that the printing light may be correctly controlled by the pedal $C^1$ in accordance with the characteristics of the negative and also to insure that the negative is properly centered, an inspection window G (Figure 4 and Figure 1) is provided in the inclined front wall of the chamber $B^2$ of the box B. This inspection window is made sufficiently long to allow a reflected image of the negative to be printed to be compared side by side with a standard negative and for this purpose a transparent mirror H is arranged between the window $B^1$ and the mirror E and in the path of the projected image of the negative. This mirror permits the passage of light through it to the mirror E and thence to the printing paper during the printing operation and as it is inclined to the axis of the projected beam at the same time allows an image of the negative to be seen through the inspection window G.

It is thus possible to compare the printing negative with a standard negative, also mounted on the window G and illuminated by a standard lamp. This lamp is not shown but it is conveniently mounted on the support $C^2$ for the printing lamp. The light from the standard lamp is admitted to the chamber $B^2$ through a suitable opening $H^1$ in its rear wall and is thence reflected by a prism $H^2$ on to the mirror H and through the standard negative on the window G.

The end wall of the chamber $B^3$ in which the glass $E^2$ is mounted is provided with a paper chute K, the centre line of which is most clearly shown in Figure 2, into which separate sheets of paper are intermittently delivered either by hand or by suitable paper feed mechanism disposed above or adjacent to the top of the chute. This chute contains a stop L arranged to hold the sheet in its "ready" position above the printing opening. When the paper is in this position it is stamped by means of a numbering device M, which may be of any suitable well known self-inking type, a resilient pad or support $M^1$ being provided on the chute and opposite the number stamp so that, during the numbering operation, the paper is supported upon a surface which will yield and thus prevent any injurious distortion of the fibres of the paper due to the pressure of the number stamp on the back thereof.

Mounted on the chute behind the screen $E^2$ is a pressure plate N and directly below the pressure plate is a second paper stop O so that after the paper has been numbered, the stop L is released to permit the paper to drop into the printing position. The stop O maintains the paper in this position until the pressure plate N clamps it against the printing screen $E^2$. Below the stop N may be arranged a delivery chute or its equivalent for the exposed sheet. To insure the correct sequence of operations of the paper stops L and O, the numbering device M, and the pressure plate N and the shutter F, are actuated by cams $L^1$, $O^1$, $M^2$, $N^1$, and $F^3$ respectively mounted on a vertical shaft P supported in bearing $P^1$ and $P^2$ and driven by an electric motor R through suitable gearing $R^1$, the motor and the gearing being indicated by dotted lines in Figures 1 and 2.

Figures 5–9 show the way in which the cams control their respective devices through suitable lever and spring biassed mechanisms. The profiles of the various cams are indicated in their relative positions on the shaft P, and the shaft is rotated in the direction of the arrow. At the particular moment shown in these figures the numbering device is in its operative position as is clear from Figure 5 where the roller $M^3$ controlling the lever mechanism of the device is shown at the bottom of the slot $M^4$ in the cam $M^2$. By the time the shaft P is moved sufficiently to raise the roller $M^3$ on to the flat part of the cam $M^2$ thus completing the operation of the numbering device, the cam $L^1$ of the paper stop L is moved until the roller $L^2$ of its lever mechanism reaches the raised portion $L^3$ of the cam $L^1$ and thus releases the stop L and permits the paper to drop into the printing position.

Just before the roller $L^2$ reaches the projection L3, the cam $N^1$ of the pressure plate operates and the roller $N^2$ moves on to the raised portion of this cam so as to release the pressure plate and permit the paper to drop into the printing position. The cam $O^1$ of the second stop O has a projection $O^2$ which engages the roller $O^3$ on the lever mechanism to release the stop directly the pressure plate N is released so that, if a print has just been made, this drops out as soon as the pressure plate is released. The raised portion $O^2$ of the cam $O^1$ is arranged so that the stop O moves back into its effective position before the stop L is released to permit the paper to drop into the printing position.

The cam $F^3$ (Figure 9) for controlling the shutter is of the face type and has a profile such that the shutter is raised for a definite period while the roller $N^2$ of the pressure plate N is on the lower part of its cam $N^1$, i. e. while the pressure plate N is clamping the paper in the printing position. It will be apparent from Figures 9 and 3, that when the roller $F^4$ of the lever mechanism controlling the shutter F is on the lower portion of the cam $F^3$, the shutter is raised to the position shown in dotted lines in Figure 3.

The general arrangement of the stops, the numbering device and the pressure plate at the back of the chute are shown most clearly at Figure 2. It will be appreciated that the various cams on the shaft P can be adjusted to alter the timing of the mechanism which they control and further that the cam which controls the shutter may be adjusted not only to enable the moment at which it comes into operation to be varied but also the duration of the exposure to be adjusted. After the duration of the exposure has been determined the necessary variations to deal with negatives of varying density are made by controlling the effective printing light.

If desired the printing paper can be carried in a box mounted on the table A and a feed mechanism provided which comprises a frame or carriage adapted to reciprocate over the table top adjacent to the negative and is provided with a series of pivoted fingers terminating in rubber or like ends adapted to bear upon the back surface of the uppermost sheet in the stack of paper. The arrangement is such that during each forward movement of the frame the fingers by engaging the back of the sheet sweep the uppermost sheet in the pile into the chute, the remaining sheets being held up against a stop or the like. The fingers may be of varying lengths so as to bear upon different points on the back of the sheet and the angular position of the fingers with relation to the sheet can be readily adjusted or they can be quickly disengaged from contact with the sheet as by means of a suitable lever or similar device.

The printing opening, the negative support and the inspection windows are conveniently of sufficient size to accommodate the largest negative with which the machine is to be used, carriers or the like being provided for the negatives of smaller size and if necessary adjustable guides being furnished both for the negative and for the paper feed.

It will be appreciated that with an apparatus made in accordance with this invention the supply of paper and the operation of the shutter controlling the exposure may be wholly automatic, the operator having only to see that the printing light is at the proper distance from the negative to insure correct exposure and that the negative is so adjusted within its guides on the table that is image is correctly centered with relation to the printing window. Hence any number of individual prints from a single negative or a succession of negatives can easily be made and the exposed prints can be discharged on to a conveyer or delivered into a basket or other receptacle in which they are conveyed to the developing operator who may work in close conjunction with the printing operator.

It will be appreciated that various constructional features can be varied within wide limits without departing from this invention.

Having now particularly described and ascertained the nature of our said invention and in what manner the same is to be performed, we declare that what we claim is:—

1. In a photographic printing machine, the combination of a negative holder adapted to receive a negative, with an objective, a printing panel, said objective being adapted to form an image of the negative at the printing panel lying at the focal plane of the objective, and a semi-transparent mirror located between the negative holder and the objective for reflecting image-forming light rays from the negative to a viewing position.

2. In a photographic printing machine, the combination of a negative holder adapted to receive a negative, with an objective, a source of light, a printing panel, said objective being adapted to form an image of the illuminated negative at the printing panel, and a semi-transparent mirror located between the negative holder and the objective for reflecting a portion of the image-forming rays from the negative to a viewing position for viewing said negative by transmitted light.

3. In a photographic printing machine, the combination of a negative holder adapted to receive a negative to be printed, with a printing panel, a source of illumination, a viewing station, and an illuminated negative mounted in the viewing station, an optical system adapted to transmit and reflect light from the negative to be printed to the printing panel and to the viewing station, whereby the negative being printed may be compared with the negative at the viewing station said optical system including a semi-transparent mirror whereby the negative being printed may be compared with the standard negative during the printing operation.

4. In a photographic printing machine the combination of a negative holder adapted to receive a negative, with a light source, a printing panel, and objective for forming an image of the negative at the printing panel, a viewing station adapted to receive a standard negative, a source of illumination for said standard negative, and a semi-transparent mirror for reflecting a portion of the light rays from a negative held in the negative holder to said viewing station, said mirror being positioned to direct the reflected light rays from the negative to be printed along side of the standard negative at the viewing station.

5. In a photographic printing machine, the combination of a negative holder adapted to receive a negative to be printed, with a printing panel, a source of illumination, and an objective located between the negative holder and printing panel, a viewing station, and an illuminated negative mounted in the viewing station, a semi-transparent mirror located on the axis of the objective for transmitting and reflecting light from the negative to be printed to the printing panel and to the viewing station, whereby the negative being printed may be compared with the negative at the viewing station.

CHARLES ZOPHER CASE.
PERCY R. ORD.